United States Patent
Chen

(10) Patent No.: US 8,381,356 B2
(45) Date of Patent: Feb. 26, 2013

(54) HINGE MECHANSIM WITH ADJUSTABLE TORQUE

(75) Inventor: Song-Ya Chen, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 210 days.

(21) Appl. No.: 12/912,756

(22) Filed: Oct. 27, 2010

(65) Prior Publication Data

US 2012/0005860 A1 Jan. 12, 2012

(30) Foreign Application Priority Data

Jul. 8, 2010 (CN) .......................... 2010 1 0219894

(51) Int. Cl.
*E05F 1/08* (2006.01)
(52) U.S. Cl. ................ 16/305; 16/307; 16/340
(58) Field of Classification Search ........... 16/304–308, 16/285, 295, 297, 303, 330, 334, 340, 342, 16/386, 321–322; 379/433.13; 455/575.3; 361/679.27

See application file for complete search history.

(56) References Cited

U.S. PATENT DOCUMENTS

| 2,626,421 | A | * | 1/1953 | Lyons | 16/300 |
| 5,197,704 | A | * | 3/1993 | Kitamura | 248/292.11 |
| 6,532,628 | B2 | * | 3/2003 | Kim | 16/342 |
| 6,584,646 | B2 | * | 7/2003 | Fujita | 16/342 |
| 6,609,272 | B1 | * | 8/2003 | Lee | 16/307 |
| 6,698,063 | B2 | * | 3/2004 | Kim et al. | 16/337 |
| 7,856,695 | B2 | * | 12/2010 | Tang et al. | 16/340 |
| 2003/0172497 | A1 | * | 9/2003 | Cha | 16/342 |

FOREIGN PATENT DOCUMENTS

WO WO 2007086627 A1 * 8/2007

* cited by examiner

*Primary Examiner* — William L. Miller
(74) *Attorney, Agent, or Firm* — Altis Law Group, Inc.

(57) ABSTRACT

A hinge mechanism includes a shaft with shaft portion, shaft sleeve, first torque spring, and first sliding member. The shaft sleeve defines a through hole for the shaft portion extending through, a slot extending substantially parallel to the through hole, and forms hooks extending from two opposite sides of the slot. The first sliding member goes over the shaft sleeve, and the first torque spring includes a first end fixed to the shaft and a second end extending through the slot and then fixed to the first sliding member. The first torque provides torque to prevent the shaft sleeve from rotating to the shaft. When the first sliding member is moved along the shaft sleeve to compress the first torque spring, the torque can be adjusted.

8 Claims, 6 Drawing Sheets

HINGE MECHANSIM WITH ADJUSTABLE TORQUE

BACKGROUND

1. Technical Field

The present disclosure relates to hinge mechanisms, especially to a hinge mechanism with adjustable torque.

2. Description of the Related Art

Generally, an electronic device, such as a mobile phone, a notebook computer, etc., has a main body and a display panel pivotally connected to the main body by a hinge with a constant torque. Though the hinge satisfies basic requirements, a hinge with an adjustable torque is still needed for improvement.

BRIEF DESCRIPTION OF THE DRAWINGS

The components of the drawings are not necessarily drawn to scale, the emphasis instead being placed upon clearly illustrating the principles of a hinge mechanism with adjustable torque. Moreover, in the drawings, like reference numerals designate corresponding parts throughout several views.

DETAILED DESCRIPTION

Figure 1:
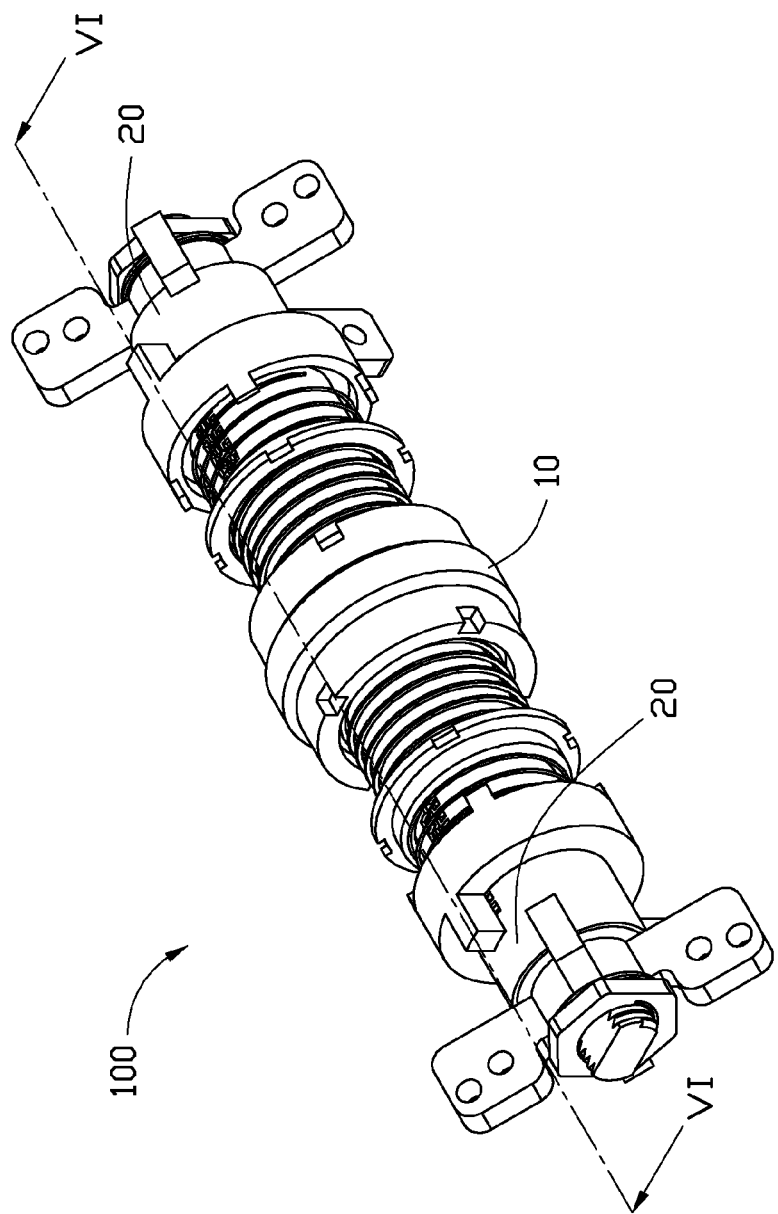
FIG. 1 is an isometric view of a hinge mechanism according to an exemplary embodiment.

Referring to FIG. 1, a hinge mechanism 100 according to an exemplary embodiment is illustrated. The hinge mechanism 100 includes a shaft 10 and two shaft sleeves 20 placed around the shaft 10. The shaft 10 and the two shaft sleeves 20 can be respectively connected to two parts (not shown), e.g. a main body and a cover of a notebook computer. Thus, the two parts can rotate relative to each other.

Figure 2:
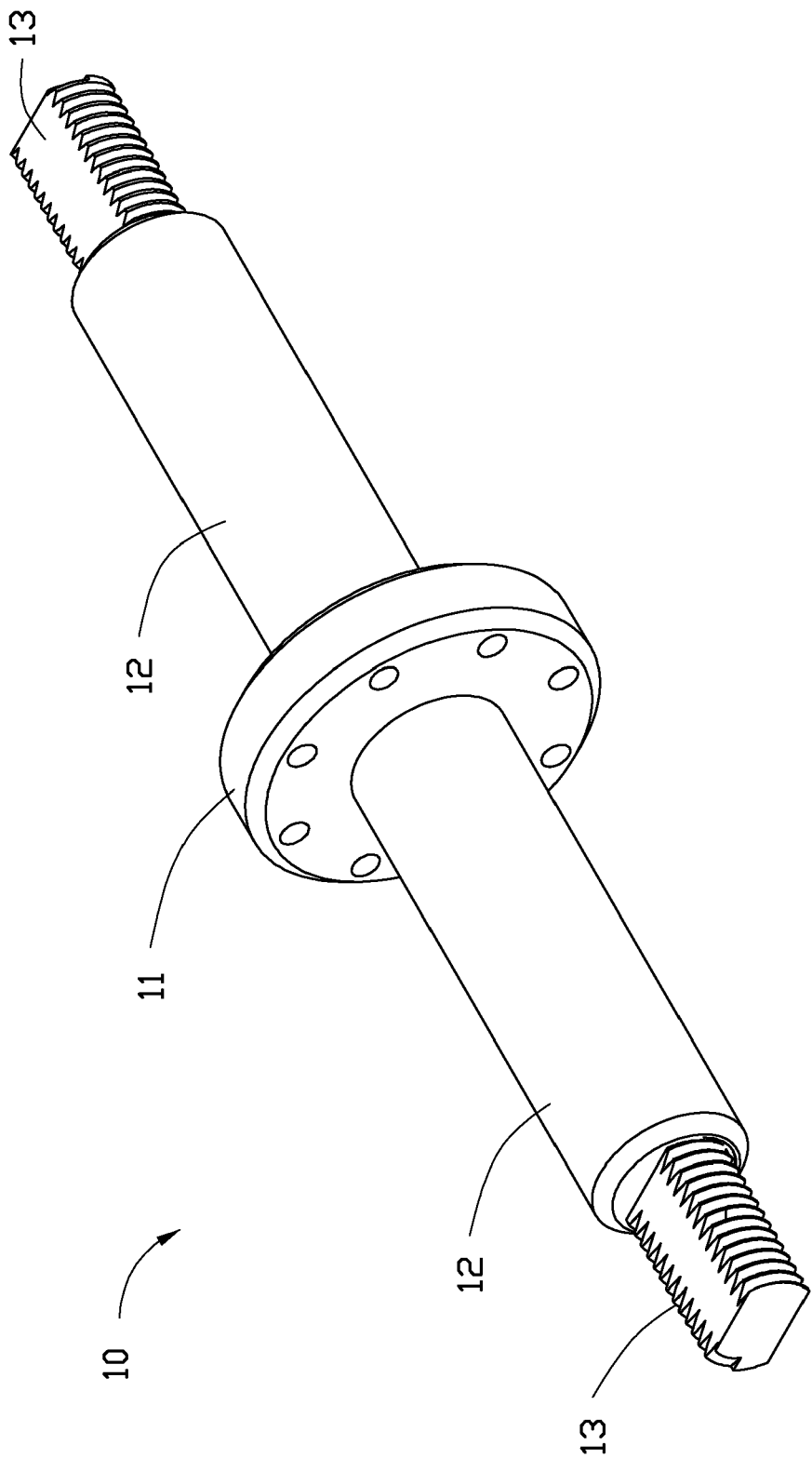
FIG. 2 is an isometric view of a shaft of the hinge mechanism of FIG. 1.

Referring to FIG. 2, the shaft 10 includes a flange portion 11 and two shaft portions 12. The two shaft portions 12 are respectively connected to the two opposite sides of the flange portion 11. Two threaded portions 13 are respectively formed circumferentially at a distal end of the two shaft portions 12.

Figure 3:
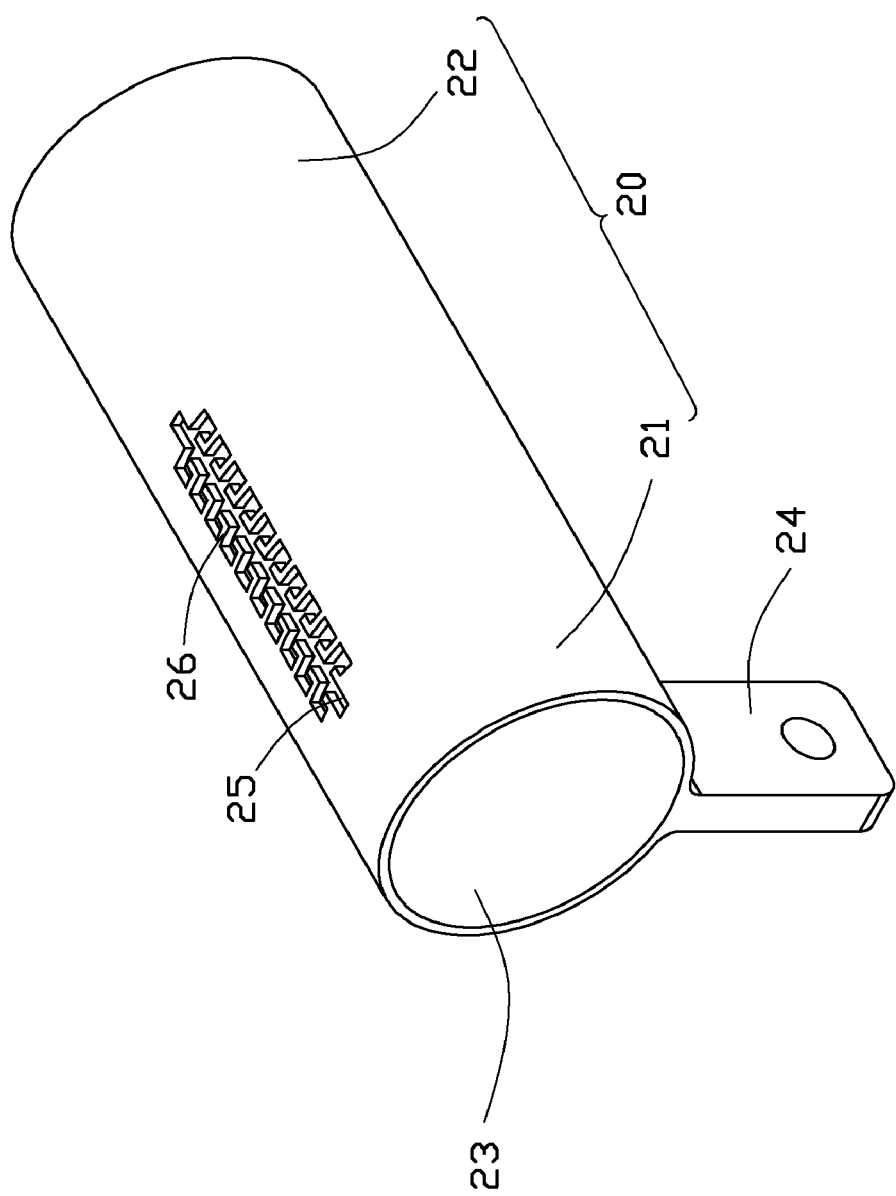
FIG. 3 is an isometric view of a shaft sleeve of the hinge mechanism if FIG. 1.

Referring to FIG. 3, the shaft sleeve 20 is cylindrical and includes a first end 21 and an opposite second end 22. The shaft sleeve 20 defines a through hole 23 for the shaft portion 12 extending through, and forms a connecting bar 24 adjacent the first end 21. The diameter of the through hole 23 is slightly greater than that of the shaft portion 12. The shaft sleeve further defines a slot 25 and a number of L-shaped hooks 26 extending from two opposite sides of the slot 25. The slot 25 extends substantially parallel to the through hole 23.

Figure 4:
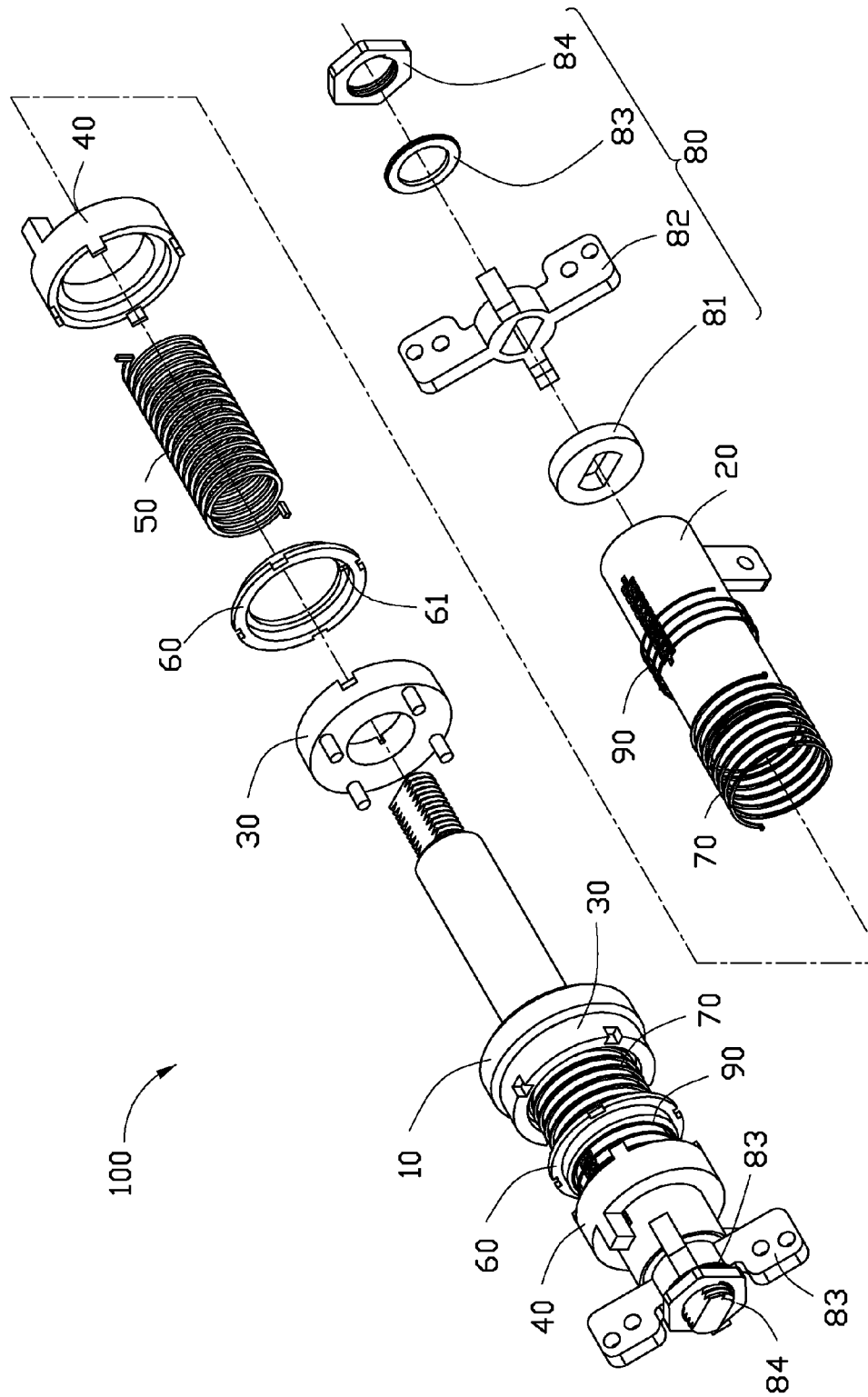
FIG. 4 is an exploded, isometric view of the hinge mechanism of FIG. 1.

Referring to FIG. 4, the hinge mechanism 100 further includes two connecting members 30, two first sliding members 40, two first torque springs 50, two second sliding members 60, two second torque springs 70, two fastening assemblies 80, and two resilient members 90.

Figure 5:
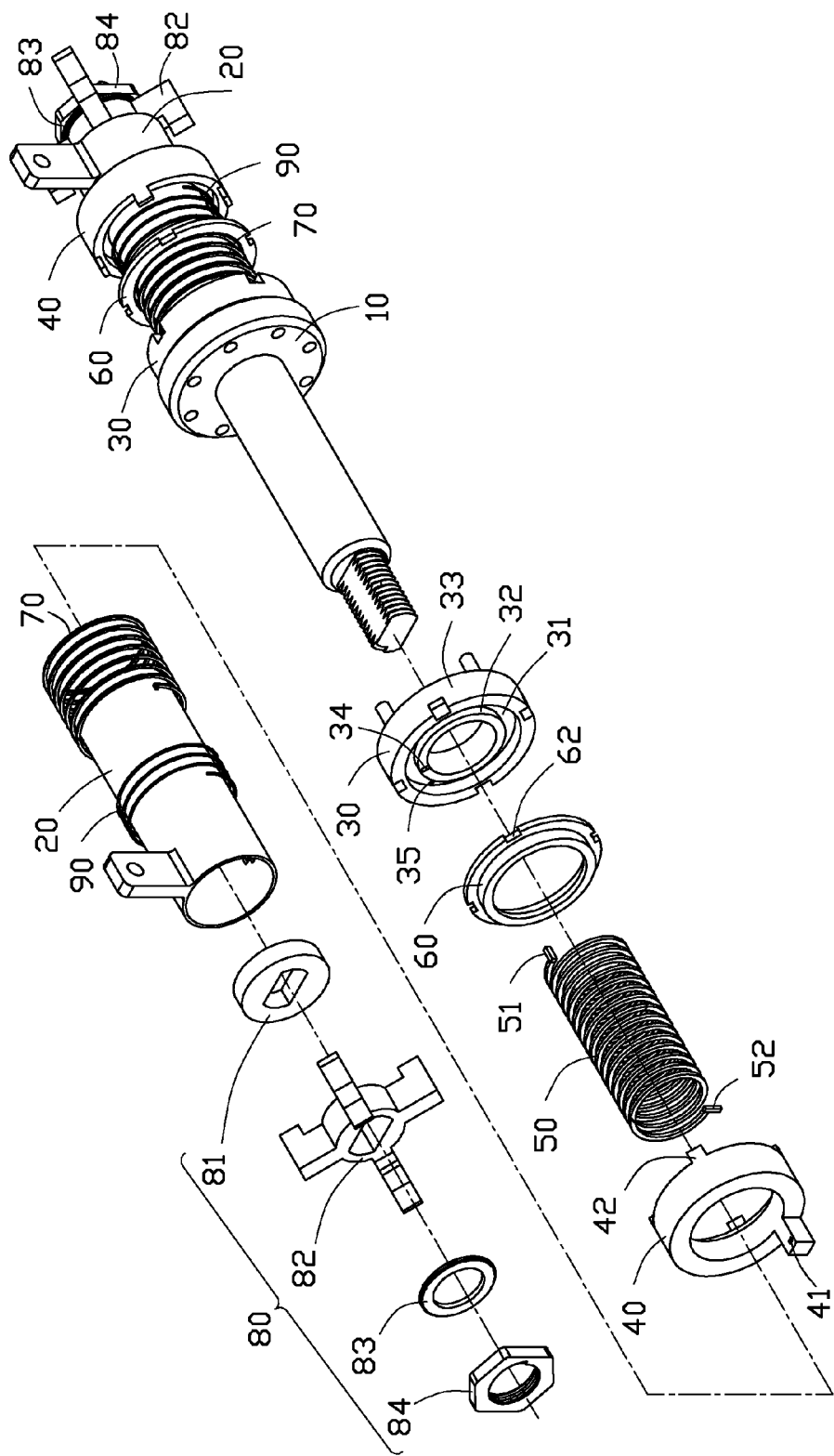
FIG. 5 is similar to FIG. 4, but viewed from another side.

Referring to FIG. 5, the connecting member 30 and the first sliding member 40 are both ring-shaped. The connecting member 30 defines an annular groove 31 on one side that forms an inner ring 32 and an outer ring 33. The inner ring 32 defines a first notch 34, and the outer ring 33 defines a second notch 35. The inner ring 32 goes over the shaft portion 12, and the connecting member 30 is fixed to the flange portion 11. The shaft sleeve 20 goes over the shaft portion 12 of the shaft 10 till the second end 22 is received in the annular groove 31.

The first sliding member 40 goes over the shaft sleeve 20 and adjacent to the first end 21. The first sliding member 40 defines a third notch 41 on one side, and forms four engaging portions 42 towards the connecting member 30.

The first torque spring 50 includes a first end 51 and a second end 52. The diameter of the first torque spring 50 is slightly greater than that of the shaft portion 12 of the shaft 10 and less than that of the through hole 23 of the shaft sleeve 20. The first torque spring 50 is coiled around the shaft portion 12. The first end 51 is fixed within the first notch 34 of the connecting member 30, and the second end 52 passes through the slot 25 and is fixed within the third notch 41 of the first sliding member 40. The hooks 26 are used to prevent the third sliding member 40 from moving along the slot 25.

The second sliding member 60 is also ring-shaped. The second sliding member 60 defines a fourth notch 61 (see FIG. 4) in an inner side and four engaging holes 62 therearound. The second sliding member 60 goes over the shaft sleeve 20 and can be moved between the first sliding member 40 and the connecting member 30. The second torque spring 70 is coiled around the shaft sleeve 20. Typically, one end of the second torque spring 70 is fixed within the second notch 35, and the other end of the second torque spring 70 is fixed within the fourth notch 61. In the embodiment, the resilient member 90 is a helical spring coiled around the shaft portion 12 and disposed between the first sliding member 40 and the second sliding member 60 on the shaft sleeve 70. The resilient member 90 is used to provide a force to prevent the first siding member 40 from moving to the second sliding member 60.

The fastening assembly 80 includes an inner washer 81, a fixed bracket 82, an outer washer 83, and a nut 84. The inner washer 81, the fixed bracket 82, the outer washer 83, and the nut 84 are orderly coiled around the threaded portion 13 of the rotary shaft 10, and work together to prevent the shaft sleeves 20, the connecting members 30, the first sliding members 40, and the second sliding members 60 from disengaging from the shaft 10.

Figure 6:
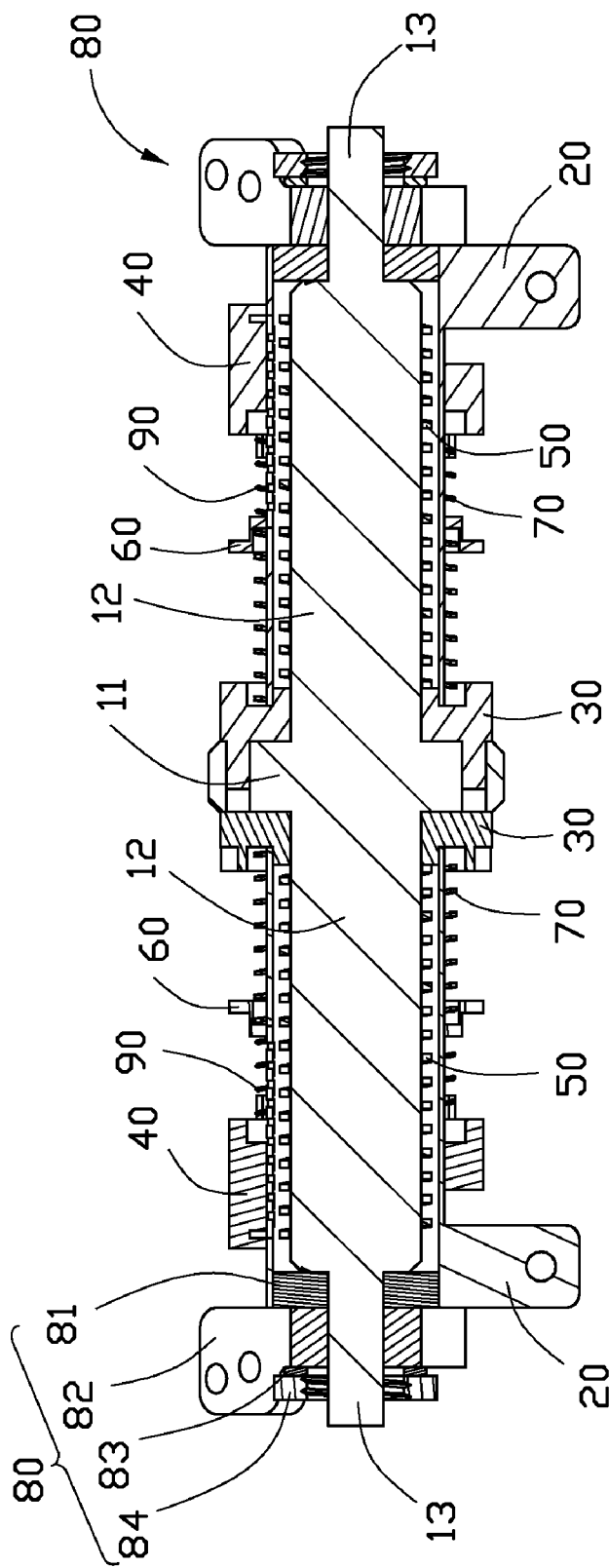
FIG. 6 is a cross-section view of the hinge mechanism, taken along the line VI-VI of FIG. 1.

Referring also to FIG. 6, while the shaft sleeves 20 rotate relative to the shaft 10, only the first torque spring 50 provides a torque F to prevent the shaft sleeves 20 from rotating. The first sliding member 40 is operable to be moved along the shaft sleeve 20 to compress the first torque spring 50 and the resilient member 90, and thus the torque F is adjusted. Until the four engaging portions 43 are fitted in the four engaging holes 62, the first connecting member 40 and the second connecting member 60 can be rotated simultaneously as driven by the shaft sleeve 20. While the shaft sleeve 20 rotates, the first torque springs 50 and the second torque springs 70 provide the torque F to the shaft sleeves 20. Thus, the torque F is further adjusted.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A hinge mechanism with adjustable torque, comprising:
   a shaft comprising at least one shaft portion;
   at least one shaft sleeve, wherein each shaft sleeve defines a through hole for one shaft portion extending through, each shaft sleeve defines a slot extending substantially parallel to the through hole, and each shaft sleeve comprises a plurality of hooks extending from two opposite sides of the slot;

at least one first torque spring, each first torque spring comprising a first end fixed to the shaft and a second end extending through the slot, wherein the at least one first torque spring provides torque to prevent the at least one shaft sleeve from rotating relative to the shaft; and at least one first sliding member each disposed around one of the at least one shaft sleeve, wherein the second end of each of the at least one first torque spring is fixed to one of the at least one first sliding member, and each of the at least one first sliding member is moved along the one of the at least one shaft sleeve to compress a corresponding one of the at least one first torque spring, thus the torque that prevents the at least one shaft sleeve from rotating is adjusted.

2. The hinge mechanism as described in claim 1, wherein the shaft comprises a flange portion and two shaft portions connected to two opposite sides of the flange portion, and thus the hinge mechanism comprises two shaft sleeves, two first torque springs, and two first sliding members.

3. The hinge mechanism as described in claim 2, further comprising two connecting members fixed to the two opposite sides of the flange portion, wherein the first end of the first torque spring is fixed to the shaft via the connecting member.

4. The hinge mechanism as described in claim 2, further comprising two second sliding members and two second torque springs, wherein each second sliding member goes over the respective shaft sleeve and is movable between the flange portion and the first sliding member, each second torque spring is coiled around the respective shaft sleeve and two opposite ends of the second torque spring are respectively fixed to the connecting member and the second sliding member, the first sliding member comprises four engaging portions toward the second sliding member, and each second sliding member defines four engaging openings around thereof.

5. The hinge mechanism as described in claim 4, further comprising two resilient members each disposed between the first sliding member and the second sliding member.

6. The hinge mechanism as described in claim 5, wherein the two resilient members are helical springs that are coiled around the shaft portions of the shaft.

7. The hinge mechanism as described in claim 2, further comprising two fastening assemblies, wherein the shaft forms two threaded portions at a distal end of the two shaft portions, each fastening assembly is fixed on one the two threaded portions to prevent the shaft sleeves and the first sliding members from disengaging from the shaft.

8. The hinge mechanism as described in claim 7, wherein each fastening-assembly comprises an inner washer, a fixed bracket, an outer washer, and a nut sequentially placed around the threaded portion of the shaft.

* * * * *